F. H. ANDERBERG.
ROOT BEER DISPENSER.
APPLICATION FILED JAN. 14, 1907.
932,942.
Patented Aug. 31, 1909.
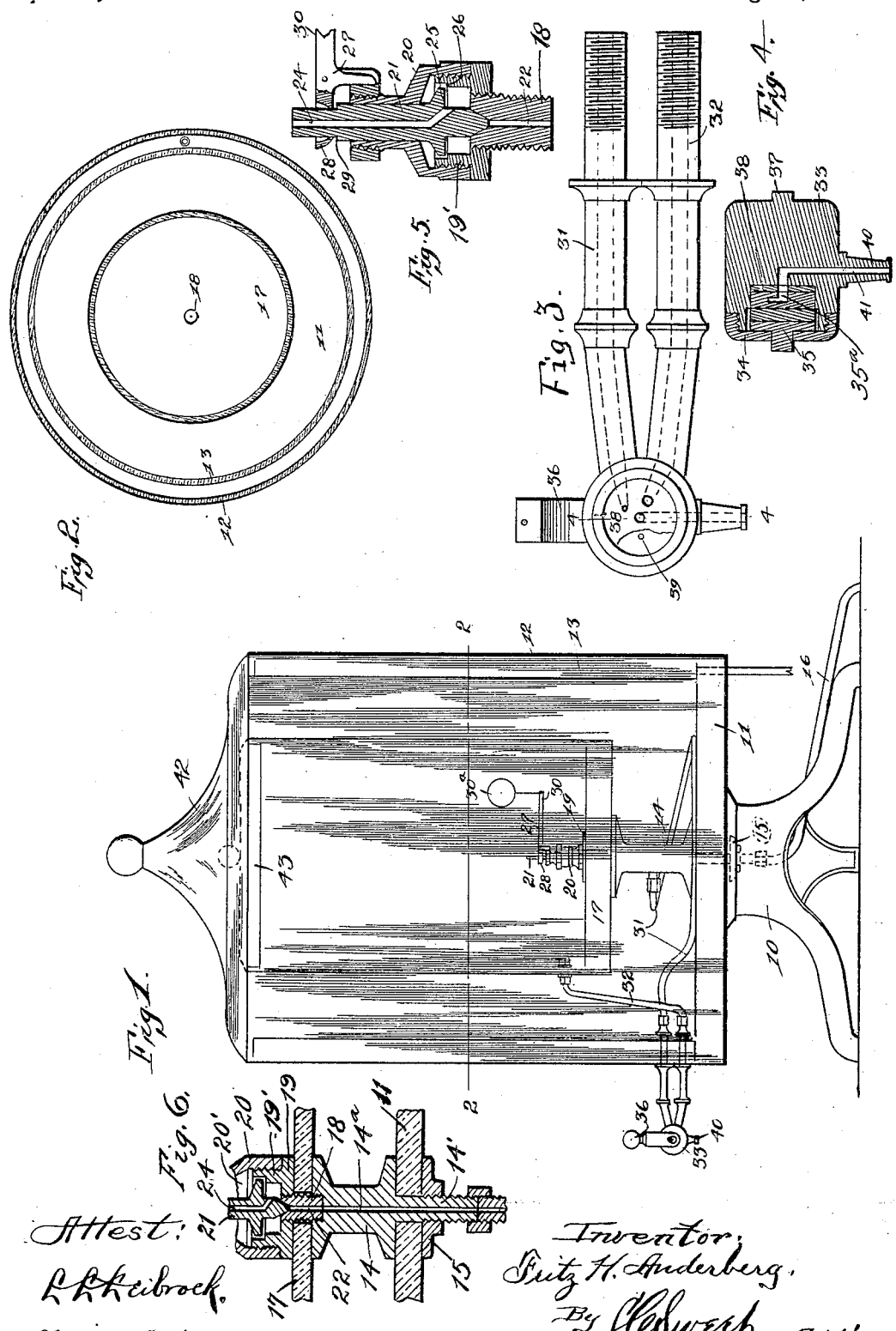

UNITED STATES PATENT OFFICE.

FRITZ H. ANDERBERG, OF ALTA, IOWA.

ROOT-BEER DISPENSER.

932,942.  Specification of Letters Patent.  Patented Aug. 31, 1909.

Application filed January 14, 1907. Serial No. 352,091.

*To all whom it may concern:*

Be it known that I, FRITZ H. ANDERBERG, a citizen of the United States of America, and resident of Alta, Buena Vista county, Iowa, have invented a new and useful Root-Beer Dispenser, of which the following is a specification.

The object of this invention is to provide improved means for dispensing beverages, such as root beer.

A further object of this invention is to provide improved means for exhibiting beverages, such as root beer.

A further object of this invention is to provide improved means for cooling beverages, such as root beer.

My invention consists in the construction, arrangement and combination of elements hereinafter set forth, pointed out in my claims and illustrated by the accompanying drawing, in which—

Figure 1 is an elevation of my complete device. Fig. 2 is a cross-section of the device on the indicated line 2—2 of Fig. 1, the dispensing pipes and valves being removed. Fig. 3 is a side elevation of a dispensing valve or faucet employed in my device. Fig. 4 is a vertical section of the faucet on the indicated line 4—4 of Fig. 3. Fig. 5 is a vertical section of the fountain valve employed in my device. Fig. 6 is a detail sectional view of the bowl support and a part of the valve mechanism controlling the flow of liquid into the bowl.

In the construction of the device as shown, the numeral 10 designates a base which may be of any desired form or construction. A jar 11, preferably made of transparent glass, and formed with annular concentric walls 12, 13 hermetically sealed at their tops, is mounted on the base 10. The jar 11 is of cylindrical form and open at its top. A hole is formed in the center of the bottom of the jar 11 and a bowl support 14 is mounted on the bottom and has a stem 14' which extends through said hole. A clamping nut 15 is screwed on the lower end of the stem 14' beneath the bottom of the jar 11 and seals said stem to said bottom. The support 14 and stem 14' are provided with a longitudinal passage-way 14ª. A pipe 16 leads from a fount (not shown) to and communicates with the lower end of the stem 14'. A bowl 17 is mounted within the jar 11 with its upper margin flush with the top of said jar. The bowl 17 preferably is made of transparent glass, is of cylindrical shape and open at its top, and is provided with a glass cover thereon.

The bowl 17 is formed with an opening in the center of its bottom, and a stem 18 extends through said opening and is seated at its lower end in the upper end portion of the support 14, (see Fig. 6). A clamping nut 19 is screwed on the upper end of the stem 18, and seals said stem to the bottom of the bowl.

The nut 19 has an annular exteriorly-threaded flange 19' to which is secured a bonnet or hood 20, forming, in conjunction with the flange 19' of the nut 19, a valve chamber 20'. A plug valve 21 is mounted for vertical reciprocation in said chamber, and is formed with a conical end portion normally seated in the upper end of the bore 22 of the stem 18.

The valve plug 21 is formed with a central longitudinal bore 24 throughout the major portion of its length and said bore leads laterally at its lower end and communicates with the interior of the valve chamber 20 immediately below the flange 25 on the plug, said flange being opposed by a shoulder 26 within the chamber. A bell crank lever 27 is fulcrumed on the valve chamber 20 and one arm of said lever extends downwardly from the fulcrum and is adapted to engage at times with the outer surface of said chamber. The other arm of the bell crank lever 27 is formed with a collar 28 surrounding the upper end portion of the valve plug 21 loosely and adapted to engage at times with a shoulder 29 on said plug and depress the plug. An arm 30 is formed on and extends horizontally from the bell crank lever 27 and a float 30ª is flexibly connected to the extremity of said arm. A pipe 31 leads laterally from the central portion of the support 14 beneath the bowl 17, and coils on the bottom of jar 11 and extends through the annular walls 12, 13 of the jar 11. A pipe 32 leads from the lower portion of the bowl 17 across the plane of the pipe 31 and laterally through the annular walls 12, 13 of the jar 11 below the other pipe. The initial end of the pipe 32 is slightly above the bottom of the bowl 17. The pipes 31 and 32 are sealed to the walls 12, 13 of the jar at the points where they pass through said walls. A valve chamber or faucet chamber 33 is mounted on and communicates with the outer end portions of the pipes 31, 32. A cap 34 is screwed on one end portion of the faucet chamber 33.

A rotary valve plug 35 is mounted in the faucet chamber 33 and is provided with an angular stem extending through the center of the cap 34, and has an elongated passage 35ᵃ for establishing communication between the faucet chamber outlet and the pipes 31, 32 as will hereinafter more fully appear.

A lever 36, of yoke form, is mounted on the faucet chamber with one of its arms journaled on a stud 37 on one end of said chamber and its other arm fixed to the stem of the valve plug 35. The lever 36 is adapted for manual oscillation toward and away from the jar 11 and any such oscillation moves the valve plug 36 rotatably. A gasket 38 is mounted between the inner end of the valve plug 35 and the adjacent face of the faucet chamber 33 and one or more studs or pins 39 on said face engage and prevent rotation of said gasket. A tip 40 is formed on and extends downward from the faucet chamber 33 and is provided with a central bore or passage 41. Communication is established between the pipe 31 and passage 41 or the pipe 32 and said passage by changing the position of the rotary valve plug 35 through manual oscillation of the lever 36. When the lever 36 is moved rearward communication is established through the elongated passage 35ᵃ between the pipe 32 and the passage 41; and when the lever 36 is moved into vertical position as shown communication is established through the passage 35ᵃ between the pipe 31 and the passage 41; and when the lever is moved forwardly, all communication between said pipes and passage is cut off. A cover 42, preferably made of transparent glass, is mounted on the jar 11.

When the parts are in the position shown in Fig. 1, the pipe 16 is connected to a fount, containing the carbonated beverage to be dispensed through the device, and the space between the bowl 17 and jar 11 is packed with shaved ice. The spacing part of the annular walls 12, 13 of the jar 11 prevents sweating or condensation on the outer surface of said jar that otherwise would arise owing to the differences in temperature between the inside and outside of the jar. The carbonated beverage contained under pressure in the fount discharges through the pipe 16 support 14 and stem 18, and raises the valve plug 21 in the chamber 20. The beverage then discharges as a jet through the bore 24 of the valve plug 21 into the bowl 17 and, as the entrapped gas escapes, finally settles as a clear, cool liquid. As the bowl 17 fills with the liquid discharged from the plug 21, the float 30 is lifted and causes bell crank lever 27 to depress the valve plug 21 and seat the conical end portion thereof in closing position in the bore 22.

After the bowl 17 is charged to the extent permitted by the float 30 the contents of the bowl are cooled by the surrounding pack of shaved ice. The liquid may be drawn from the bowl 17 through the faucet into a serving glass in settled condition and when said glass is nearly filled, the faucet is operated to draw a quantity of the liquid directly from the fount and stem 14 through the pipe 31, which portion of liquid is cooled in the coil in the pack and on entering the serving glass is aerated and provides a foam or bead on the liquid previously drawn in the glass.

The transparent glass container shows the liquid of a dark and attractive color through the shaved ice and said container has the additional advantage of being cleanly in appearance and easily kept clean. The glass container constructed as shown also provides excellent facilities for maintaining a low temperature in the liquid immediately prior to dispensing. The construction of pipes and valves automatically maintains a supply of aerated liquid in the bowl 17 and the further provision of direct communication between the fount and faucet, auxiliary to the ordinary serving connection with aerated liquid in the bowl, provides the additional advantage of serving the liquid in fresh appearing, frothy, beady condition. These various elements combine to produce a dispenser which presents a pleasing and attractive appearance to the prospective customer and presents to him an appetizing and satisfying impression.

I claim as my invention:

1. A root beer dispenser comprising a transparent jar, a hollow stem mounted upon the bottom thereof, a transparent bowl mounted on and communicating with said stem within the jar and spaced apart from the sides and bottom of the jar, said stem extending through the bottom of the jar, a supply means communicating with said stem, a clamping nut mounted upon the upper end of said stem and connecting the latter to the bowl, said nut provided with a vertically-extending angular flange having a peripheral thread, said flange having a shoulder on its inner face near the top thereof, a hood inclosing and connected to said flange and forming in connection with the flange a valve chamber, a vertically movable valve plug extending through the hood and into said chamber and provided with a flange adapted to engage said shoulder whereby the downward movement of the valve plug is limited, said plug having a conical lower end adapted to engage said stem for closing the upper end thereof, said plug further provided with a bore communicating with said jar and with said chamber, said plug projecting above the hood and having a peripheral shoulder, a lever supported from the hood and having one arm engaging the shoulder of the plug to shift it, a float flexibly connected to the lever for actuating it to shift the plug, a discharge means leading from the bowl, a discharge means leading from the stem, conducting pipes extending through the wall of the jar, and a valve mechanism common to and controlling both of said conducting pipes and arranged exteriorly of the jar.

2. A root beer dispenser comprising a transparent jar, a hollow stem mounted upon the bottom thereof, a transparent bowl mounted on and communicating with said stem within the jar and spaced apart from the sides and bottom of the jar, said stem extending through the bottom of the jar, a supply means communicating with said stem, a clamping nut mounted upon the upper end of said stem and connecting the latter to the bowl, said nut provided with a vertically-extending angular flange having a peripheral thread, said flange having a shoulder on its inner face near the top thereof, a hood inclosing and connected to said flange and forming in connection with the flange a valve chamber, a vertically movable valve plug extending through the hood and into said chamber and provided with a flange adapted to engage said shoulder whereby the downward movement of the valve plug is limited, said plug having its conical lower end adapted to engage said stem for closing the upper end thereof, said plug further provided with a bore communicating with said jar and with said chamber, said plug projecting above the hood and having a peripheral shoulder, a lever supported from the hood and having one arm engaging the shoulder of the plug to shift it, a float flexibly connected to the lever for actuating it to shift the plug, a discharge pipe leading from said bowl near the bottom thereof, a discharge pipe leading from the stem at a point between the ends thereof, a pair of conducting pipes secured in the wall of the jar and coupled at their inner ends to the discharge pipes, a valve mechanism connected to the outer ends of said conducting pipes and constituting a common controlling means for said discharge pipes, and a closure of the jar.

Signed by me at Alta, Iowa, this 2nd day of January, 1907,

FRITZ H. ANDERBERG.

Witnesses:
 EDWARD LARSEN,
 F. N. BUCKINGHAM.